(12) United States Patent
Solie et al.

(10) Patent No.: US 7,990,116 B2
(45) Date of Patent: Aug. 2, 2011

(54) MODULATOR WITH LINEAR PERIOD STRETCHING CAPABILITY

(75) Inventors: Eric Magne Solie, Durham, NC (US); Robert Leon Lyle, Jr., Raleigh, NC (US)

(73) Assignee: Intersil Americas Inc., Milpitas, CA (US)

( * ) Notice: Subject to any disclaimer, the term of this patent is extended or adjusted under 35 U.S.C. 154(b) by 609 days.

(21) Appl. No.: 12/173,602

(22) Filed: Jul. 15, 2008

(65) Prior Publication Data

US 2009/0108826 A1 Apr. 30, 2009

Related U.S. Application Data

(60) Provisional application No. 60/982,606, filed on Oct. 25, 2007.

(51) Int. Cl.
 *G05F 1/652* (2006.01)
 *G05F 1/656* (2006.01)

(52) U.S. Cl. ........ 323/222; 323/282; 323/283; 323/284; 323/285

(58) Field of Classification Search ................... 323/222, 323/282, 283, 284, 285

See application file for complete search history.

(56) References Cited

U.S. PATENT DOCUMENTS

| | | | |
|---|---|---|---|
| 7,034,586 B2 * | 4/2006 | Mehas et al. .................. | 327/143 |
| 7,098,632 B2 * | 8/2006 | Chen et al. .................... | 323/222 |
| 7,298,124 B2 * | 11/2007 | Kan et al. ...................... | 323/283 |
| 2006/0113974 A1 * | 6/2006 | Kan et al. ...................... | 323/282 |
| 2006/0284567 A1 * | 12/2006 | Huynh et al. .................. | 315/246 |

* cited by examiner

*Primary Examiner* — Bao Q Vu

(74) *Attorney, Agent, or Firm* — Howison & Arnott, L.L.P.

(57) ABSTRACT

A modulator for use with a voltage regulator includes an input for receiving an input voltage, an output for providing a periodic triangular wave form and at least one input for receiving an indication that the voltage regulator is in a discontinuous current mode of operation. The circuitry within the modulator generates the periodic triangular wave form responsive to the input voltage and the indication that the voltage regulator is in the discontinuous current mode of operation. The circuitry further continuously increases a period of the periodic triangular wave form responsive to a decreased load in a discontinuous current mode of operation of the voltage regulator.

21 Claims, 4 Drawing Sheets

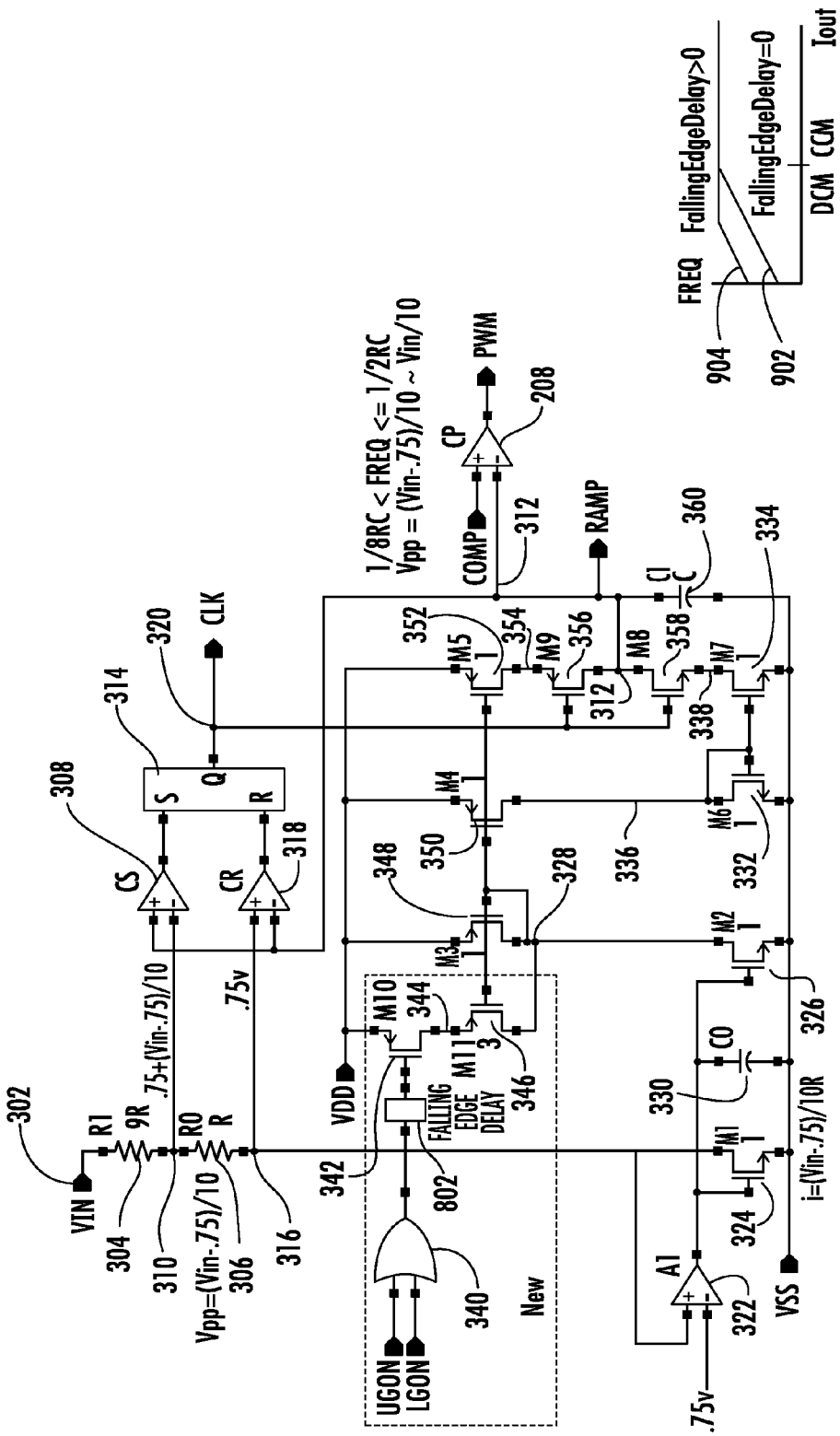

MODULATOR WITH LINEAR PERIOD STRETCHING CAPABILITY

CROSS-REFERENCE TO RELATED APPLICATIONS

This application claims the benefit of U.S. Provisional Application for Patent Ser. No. 60/982,606, filed Oct. 25, 2007, and entitled "MODULATOR WITH LINEAR PERIOD STRETCHING IN DISCONTINUOUS CURRENT MODE", the specification of which is incorporated herein by reference.

TECHNICAL FIELD

The present invention relates to modulators used within voltage regulator circuits, and more particularly, to a modulator having linear period stretching capabilities when operating in the discontinuous current mode.

BACKGROUND

A narrow voltage DC charger (NVDC charger) is required to maintain 70% efficiency down to a 15 milliamp current. Some modulators within voltage regulator circuits can meet this requirement but are required to use type 3 compensation. At light loads, with type 3 compensation, the compensation pin of the voltage regulator sits at its lower clamp voltage and the voltage quickly rises to the ripple value each time a pulse is needed. With type 1 compensation, the compensation pin includes a capacitor connected to ground. When the error amplifier of the voltage regulator determines that a pulse is required, a long period of time is necessary for the compensation pin to rise to the ripple voltage value. While the compensation pin is slewing, the output voltage continues to drop. By the time the compensation pin reaches the ripple value, several pulses are required before the error amplifier determines that enough pulses have been received, and the compensation pin falls back to its lower clamp value. This results in a burst of pulses and subharmonic oscillations in the voltage regulator circuit.

BRIEF DESCRIPTION OF THE DRAWINGS

For a more complete understanding, reference is now made to the following description taken in conjunction with the accompanying Drawings in which:

FIG. 8 illustrates an alternative embodiment of the circuitry of FIG. 3 including linear pulse stretching capabilities in the discontinuous current mode; and FIG. 9 illustrates the frequency of the circuit of FIG. 8 in the discontinuous current mode and continuous current mode for various settings of the falling edge delay block.

SUMMARY

The present invention, as disclosed and described herein, includes in one aspect thereof a modulator for use with a voltage regulator. The modulator includes an input for receiving an input voltage, an output for providing a periodic triangular wave form and at least one input for receiving an indication that the voltage regulator is in a discontinuous current mode of operation. Circuitry within the modulator generates the periodic triangular waveform responsive to the input voltage and the indication that the voltage regulator is in the discontinuous current mode of operation. The circuitry further continuously increases a period of the periodic triangular wave form responsive to a decreased load in a discontinuous current mode of operation of the voltage regulator.

DETAILED DESCRIPTION

Although the preferred embodiment has been described in detail, it should be understood that various changes, substitutions and alterations can be made therein without departing from the spirit and scope of the invention as defined by the appended claims.

Figure 1:
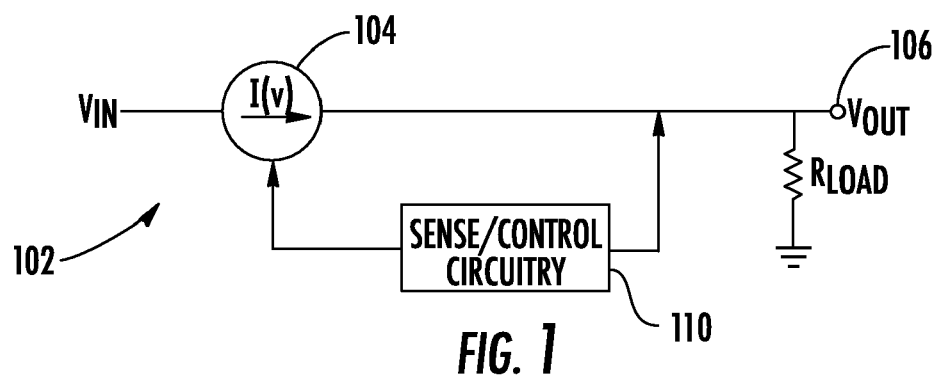
FIG. 1 is a functional block diagram of a voltage regulator circuit.

Referring now to the drawings, and more particularly to FIG. 1, there is illustrated a voltage regulator circuit 102. Every electronic circuit is designed to operate off of some type of voltage supply which is assumed to be constant. A voltage regulator provides this constant DC output voltage and contains circuitry that continuously holds the output voltage at the designed value regardless of changes in load current or input voltage. A voltage regulator 102 operates by using a voltage controlled current source 104 in order to force a fixed voltage to appear at the regulator output terminal 106. A sense/control circuit 110 monitors the output voltage, and adjusts the current source 104 to hold the output voltage at the desired level. The design limit of the current source 104 defines the maximum load current the voltage regulator 102 that can be sourced and still maintain voltage regulation.

The output voltage is controlled using a feedback loop which requires some type of compensation to assure loop stability. Most voltage regulators 102 have built-in compensation and are completely stable without external components. However, some voltage regulators 102 require some external capacitance connected from the output lead to ground to ensure regulator stability. Another characteristic of a voltage regulator 102 is that it requires a finite amount of time to correct the output voltage after a change in a load current demand. The time lag defines the characteristic transient response of the voltage regulator 102, which is a measure of how fast the voltage regulator returns to steady state after a load change. Voltage regulation may be used in any number of electronic devices to control an output voltage.

In a continuous current mode of operation, the current through the inductor never falls to zero during a computation cycle. In a discontinuous mode of operation, the amount of energy required by the load is small enough to be transferred in a time smaller than the entire switching period. In this case, the current through the inductor falls to zero during part of the period. Thus, the inductor is completely discharged at the end of the switching cycle.

Figure 2:
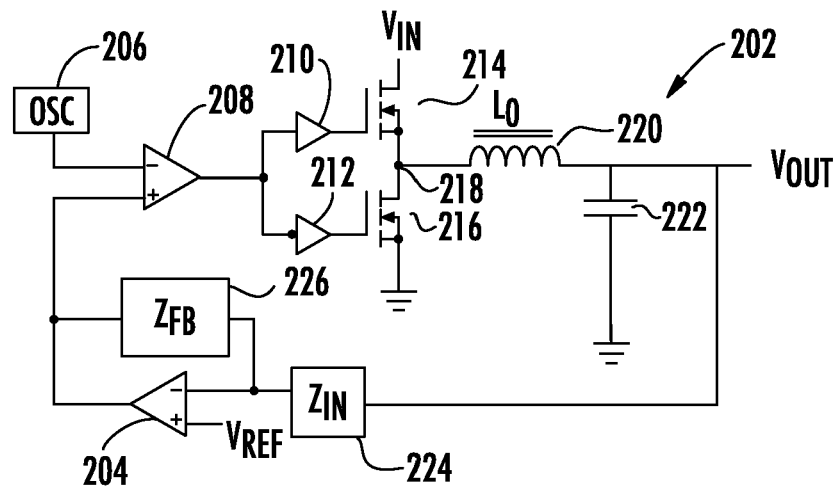
FIG. 2 is a schematic block diagram of a voltage regulator with a PWM converter circuit.

Referring now to FIG. 2, there is illustrated a voltage regulator within a PWM DC-DC converter circuit 202 (a voltage regulator). The output voltage VOUT is regulated to the reference voltage signal VREF applied to a positive input of error amplifier 204. The error amplifier 204 output is compared with the output of oscillator/modulator 206, which is a triangular waveform, at the PWM comparator 208. The output of the PWM comparator 208 is applied to driver circuits 210 and 212, which drive the gates of transistors 214 and 216. This process provides a pulse width modulated waveform with an amplitude of VIN at a phase node 218 connected to a first side of inductor 220. The PWM waveform provided from phase node 218 is smoothed by an output filter consisting of inductor 220 and capacitor 222. In a continuous current mode of operation, the current through the inductor never falls to zero during a switching cycle. In a discontinuous mode of operation, the amount of energy required by the load is small enough to be transferred in a time smaller than the entire switching period. In this case, the current through the inductor falls to zero during part of the period. Thus, the inductor is completely discharged at the end of the switching cycle. The error amplifier 204 has an input impedance ZIN 224 and an FB pin impedance ZFB 226. The input impedance 224 and the FB pin impedance 226 comprise a compensation loop for the error amplifier 204.

Figure 3:
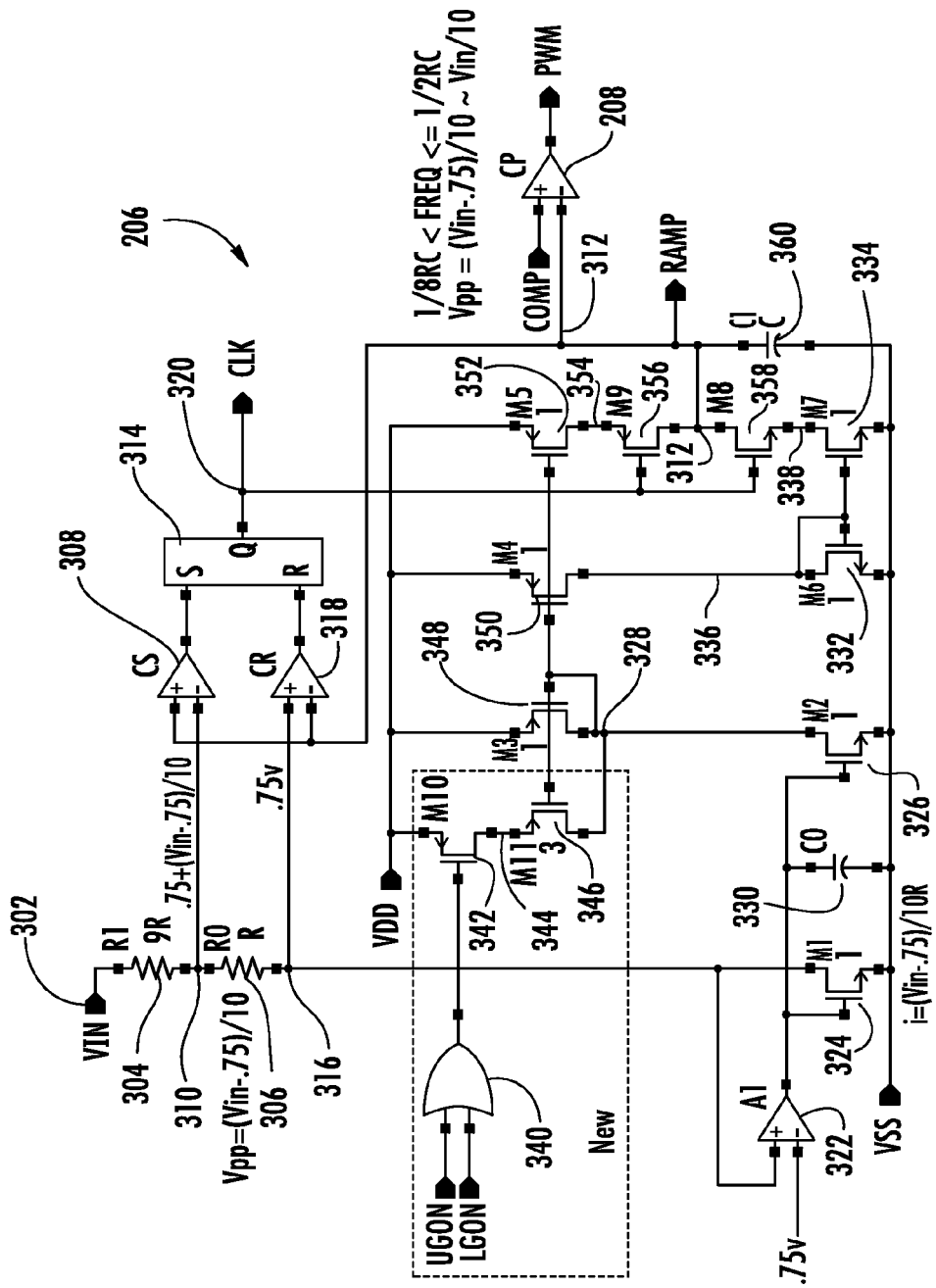
FIG. 3 is a schematic diagram of the oscillator and PWM comparator including linear pulse stretching capabilities in the discontinuous current mode.

Referring now to FIG. 3, there is more fully illustrated a schematic diagram of the modulator circuit 206 and comparator 208 in more detail. As described previously in FIG. 1, the comparator 208 provides a PWM control signal to driver circuits 210 and 212 (FIG. 2) responsive to comparison between a triangular wave form signal provided from the modulator 206 and an input from the COMP pin of the voltage regulator 202. The modulator 206 connects to the negative input of comparator 208 while the COMP pin of the voltage regulator 202 is connected with the positive input of comparator 208. The input signal VIN is applied to the modulator circuit 206 at node 302, across a voltage divider circuit consisting of resistor 304 and resistor 306. A comparator 308 has its negative input connected to node 310 between the resistors 304 and 306. The positive input of comparator 308 is connected to the negative input of comparator 208 at node 312. The output of comparator 308 is connected to the S input of SR latch 314. A second comparator 318 is connected to the bottom of resistor 306 at node 316 by its positive node. The negative node of comparator 318 is also connected to the negative input of comparator 208 at node 312. The output of comparator 318 connects with the R input of SR latch 314. The Q output of the SR latch is provided as a signal CLK at node 320.

An amplifier 322 has its negative input connected to receive a 0.75 volt reference signal and its positive input connected to node 316. The output of comparator 322 is connected to the gates of transistors 324 and 326. Transistor 324 is an N-channel transistor having its drain/source path connected between node 316 and ground. Transistor 326 is also an N-channel transistor having its drain/source path connected between node 316 and ground. Transistor 326 is an N-channel transistor having its drain/source path connected between node 328 and ground. A capacitor 330 is connected between the output of amplifier 322 and ground. Transistor 326 comprises a current mirror with transistor 324. An additional current mirror consisting of transistors 332 and 334 also mirror the current through transistor 324. Transistor 332 is an N-channel transistor having its drain/source path connected between node 336 and ground. The gate of transistor 332 is connected to its drain and is also connected to the gate of transistor 334. Transistor 334 is an N-channel transistor having its drain/source path connected between node 338 and ground.

The amplifier 322 drives transistor 324 such that its drain connected to node 316 is at 0.75 volts. This applies a 0.75 volt signal to the positive input of comparator 318. The current through transistor 324 is equal to $(V_{IN}-0.75\text{ v})/10*R$ and is mirrored through transistors 326, 328, 350, 352, 332 and 334, respectively. The current is also switched by transistors 356 and 358 between the charge and discharge current for ramp capacitor 360. When the CLK signal from the output Q of SR latch 314 is high, transistor 358 is turned on and transistor 356 is turned off causing the current to discharge capacitor 360 towards ground. When the capacitor charge reaches 0.75 volts, comparator 318 detects this and resets the latch bringing the CLK signal of latch 314 low. When the CLK signal is low, transistor 356 is turned on and transistor 358 is turned off. This causes the current mirrored from transistor 324 to charge capacitor 360. When the charge of capacitor 360 reaches 0.75 volts+$(V_{IN}-0.75\text{ v})/10$, comparator 308 detects this and sets the latch 314 bringing the CLK signal back high. This process repeats and results in a peak to peak voltage of $(V_{IN}-0.75\text{ v})/10$. This provides a feed forward function since the peak to peak ramp voltage is nearly proportional to $V_{IN}$ (assuming $V_{IN}$ is much greater than 0.75 v). Given that the charge current is $(V_{IN}-0.75\text{ v})/(10*R)$ and that the capacitor moves $(V_{IN}-0.75\text{ v})/10$ in half a period, using ohm's law the frequency of the RAMP sawtooth is $1/(2RC)$ and is independent of $V_{IN}$.

Control signal UGON indicates whether switching transistor 214 is on or off and control signal LGON indicates whether transistor 216 is on or off. UGON and LGON are connected to the inputs of OR gate 340. The output of OR gate 340 is connected to the gate of P-channel transistor 342. The source/drain path of P-channel transistor 342 is connected between VDD and node 344. A number of P-channel transistors 346, 348, 350 and 352 are connected as current mirrors and each have their gates interconnected with each other. Transistor 346 has its source/drain path connected between node 344 and node 328. Transistor 348 has its drain/source path connected between VDD and node 328. The gate of transistor 348 is also connected to its drain at node 328. Transistor 350 has its source/drain path connected between VDD and node 336. Finally, transistor 352 has its source/drain path connected between VDD and node 354.

Connected in series between transistors 352 and 334 are P-channel transistor 356 and N-channel transistor 358. These transistors are used for charging and discharging a capacitor 360 connected between node 312 and ground as will be described herein below. Transistor 356 has its source/drain path connected between node 354 and node 312. Transistor 358 has its drain/source path connected between node 312 and node 338. The gate of each of transistor 356 and 358 are connected to the CLK signal from the SR latch 314 at node 320. The triangle wave form of the modulator 206 is provided from node 312.

Figure 4:
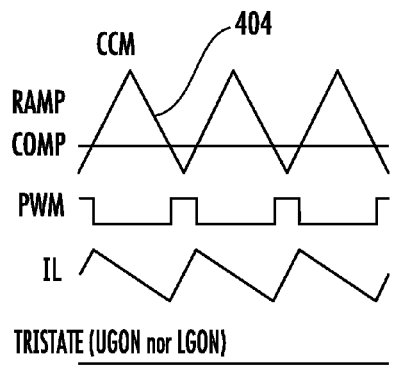
FIG. 4 illustrates the various outputs of the circuit of FIG. 3 in continuous current mode.

The circuitry consisting of OR gate 340 and transistors 342 and 346 enable the modulator 206 to linearly stretch the period of the ramp signal as the load of the voltage regulator reduces from the discontinuous current mode boundary and keeps a fixed frequency at continuous current mode currents. As illustrated in FIG. 4, when the circuit is operating in continuous current mode, the circuit has no significant tri state time and the period of the ramp signal 404 is not stretched, and maintains a fixed frequency.

Figure 5:
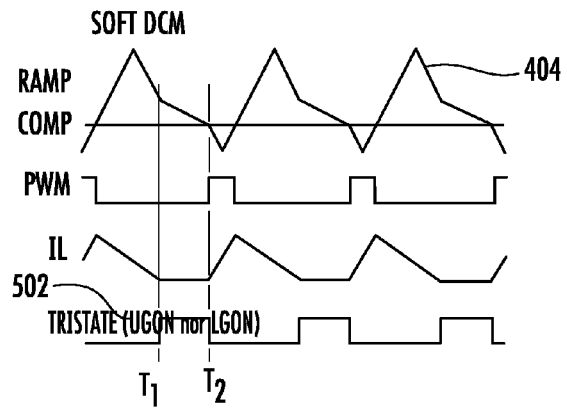
FIG. 5 illustrates the various outputs of the circuit of FIG. 3 in soft discontinuous current mode.

As shown in FIG. 5, when the modulator 206 is operating within discontinuous current mode with diode emulation, there is a tri state time occurring between $T_1$ and $T_2$ when the inductor current through inductor 220 reaches 0 amps and both controls signals UGON and LGON are low. During this tri state time, transistor 342 is turned on due to the fact that UGON and LGON are both at logic low, providing a logic low signal on the output of OR gate 340. When transistor 342 is turned on this causes transistor 346 to be placed in parallel with transistors 348, 350 and 352 increasing the mirror master width by 4× so that the charge/discharge current into the capacitor 360 is reduced by 4×. Since the capacitor 360 is being charged or discharged more slowly, the tri state time is stretched out and the frequency is reduced. This can be seen in FIG. 5 from the time period beginning at time $T_1$ and extending to time $T_2$.

Figure 6:
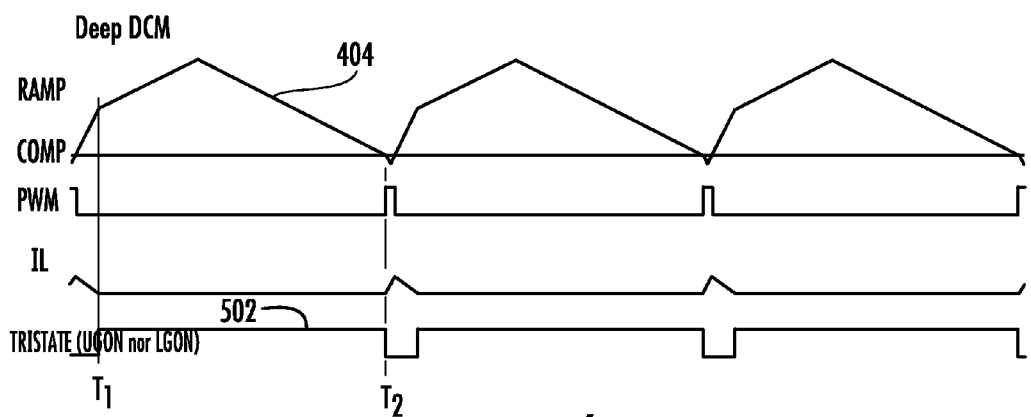
FIG. 6 illustrates various outputs of the circuit of FIG. 3 in deep discontinuous current mode.

Since the capacitor 360 is taking longer to charge or discharge, the ramp output period increases. This time period between $T_1$ and $T_2$ is consistent with the time that the inductor IL is at 0 between $T_1$ and $T_2$ and the time that the values of UGON and LGON are both low as indicated by the last wave form 502. In deep discontinuous current mode as illustrated in FIG. 6, as the loads of the voltage regulator are further reduced, the tri state time between time $T_1$ and $T_2$ are stretched out even more and the frequency of the ramp signal 404 is further reduced. At no load, the power transistors are tri stated. With the charge/discharge current reduced for most of the period, the frequency drops to nearly one-fourth the continuous current mode frequency. The minimum frequency is established by the sizing of transistor 346. Thus, this circuitry achieves the goals of reducing the frequency linearly as the load levels of the voltage regulator go deeper into the discontinuous current mode, constant frequency in continuous current mode, no subharmonic oscillations at light loads with type 1 compensation, VIN feed forward, and minimum frequency control to prevent audio noise.

Figure 7:
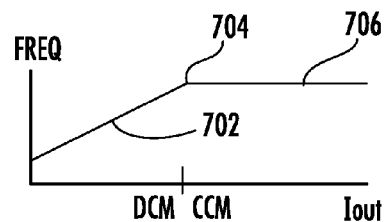
FIG. 7 illustrates the change in frequency of the modulator circuit with respect to output current in discontinuous current mode and continuous current mode.

Referring now to FIG. 7, there is illustrated the change in frequency with respect to the output current in the discontinuous and continuous modes of operation. Thus, when the output current is in the discontinuous mode of operation on the portion of the line 702, the frequency is seen to decrease the lower the output current is. Once the voltage regulator enters the continuous current mode of operation at point 704, the frequency remains constant throughout the continuous mode of operation as illustrated generally at 706.

Referring now to FIG. 8, there is illustrated an alternative embodiment of the schematic diagram of FIG. 3. Referring now to FIG. 3, there is more fully illustrated a schematic diagram of the modulator circuit 206 and comparator 208 in more detail. As described previously in FIG. 1, the comparator 208 provides a PWM control signal to driver circuits 210 and 212 (FIG. 2) responsive to comparison between a triangular wave form signal provided from the modulator 206 and an input from the COMP pin of the voltage regulator 202. The modulator 206 connects to the negative input of comparator 208 while the COMP pin of the voltage regulator 202 is connected with the positive input of comparator 208. The input signal VIN is applied to the modulator circuit 206 at node 302, across a voltage divider circuit consisting of resistor 304 and resistor 306. A comparator 308 has its negative input connected to node 310 between the resistors 304 and 306. The positive input of comparator 308 is connected to the negative input of comparator 208 at node 312. The output of comparator 308 is connected to the S input of SR latch 314. A second comparator 318 is connected to the bottom of resistor 306 at node 316 by its positive node. The negative node of comparator 318 is also connected to the negative input of comparator 208 at node 312. The output of comparator 318 connects with the R input of SR latch 314. The Q output of the SR latch is provided as a signal CLK at node 320.

An amplifier 322 has its negative input connected to receive a 0.75 volt reference signal and its positive input connected to node 316. The output of comparator 322 is connected to the gates of transistors 324 and 326. Transistor 324 is an N-channel transistor having its drain/source path connected between node 316 and ground. Transistor 326 is an N-channel transistor having its drain/source path connected between node 328 and ground. A capacitor 330 is connected between the output of amplifier 322 and ground. Transistor 326 comprises a current mirror with transistor 324. An additional current mirror consisting of transistors 332 and 334 also mirror the current through transistor 324. Transistor 332 is an N-channel transistor having its drain/source path connected between node 336 and ground. The gate of transistor 332 is connected to its drain and is also connected to the gate of transistor 334. Transistor 334 is an N-channel transistor having its drain/source path connected between node 338 and ground.

The amplifier 322 drives transistor 324 such that its drain connected to node 316 is at 0.75 volts. This applies a 0.75 volt signal to the positive input of comparator 318. The current through transistor 324 is equal to $(V_{IN}-0.75\text{ v})/(10*R)$ and is mirrored through transistors 326, 348, 350, 352, 332 and 334, respectively. The current is also switched by transistors 356 and 358 between the charge and discharge current for ramp capacitor 360. When the CLK signal from the output Q of SR latch 314 is high, transistor 358 is turned on and transistor 356 is turned off causing the current to discharge capacitor 360 towards ground. When the capacitor charge reaches 0.75 volts, comparator 318 detects this and resets the latch bringing the CLK signal of latch 314 low. When the CLK signal is low, transistor 356 is turned on and transistor 358 is turned off. This causes the current mirrored from transistor 324 to charge capacitor 360. When the charge of capacitor 360 reaches $0.75\text{ volts}+(V_{IN}-0.75\text{ v})/10$, comparator 308 detects this and sets the latch 314 bringing the CLK signal back high. This process repeats and results in a peak to peak voltage of $(V_{IN}-0.75\text{ v})/10$. This provides a feed forward function since the peak to peak ramp voltage is nearly proportional to $V_{IN}$ (assuming $V_{IN}$ is much greater than 0.75 v). Given that the charge current is $(V_{IN}-0.75\text{ v})/(10*R)$ and that the capacitor moves $(V_{IN}-0.75\text{ v})/10$ in half a period, using ohm's law the frequency of the RAMP sawtooth is $1/(2RC)$ and is independent of $V_{IN}$.

Control signal UGON indicates whether switching transistor 214 is on or off and control signal LGON indicates whether transistor 216 is on or off. UGON and LGON are connected to the inputs of OR gate 340. The output of OR gate 340 is connected to the gate of P-channel transistor 342. The source/drain path of P-channel transistor 342 is connected between VDD and node 344. A number of P-channel transistors 346, 348, 350 and 352 are connected as current mirrors and each have their gates interconnected with each other. Transistor 346 has its source/drain path connected between node 344 and node 328. Transistor 348 has its drain/source path connected between VDD and node 328. The gate of transistor 348 is also connected to its drain at node 328. Transistor 350 has its source/drain path connected between VDD and node 336. Finally, transistor 352 has its source/drain path connected between VDD and node 354.

Connected in series between transistors 352 and 334 are P-channel transistor 356 and N-channel transistor 358. These transistors are used for charging and discharging a capacitor 360 connected between node 312 and ground as will be described herein below. Transistor 356 has its source/drain path connected between node 354 and node 312. Transistor 358 has its drain/source path connected between node 312 and node 338. The gate of each of transistor 356 and 358 are connected to the CLK signal from the SR latch 314 at node 320. The triangle wave form of the modulator 206 is provided from node 312.

Placed between the OR gate 340 and the gate of transistor 342 is a falling edge delay circuit 802. If the delay within the falling edge delay circuit 802 is set to 0 microseconds, the behavior of the circuit is the same as that described previously with respect to FIG. 3. If the delay within the falling edge delay circuit 802 is set to longer than 0 microseconds, the load at which the frequency starts dropping falls below the CCM/DCM boundary. The operation of the circuit including the falling edge delay circuit 802 is more fully illustrated in FIG. 9. Line 902 illustrates when the falling edge delay value is set equal to 0. As can be seen, the frequency begins dropping at the DCM/CCM boundary. Line 904 illustrates that when the falling edge delay is set to greater than 0, the load at which the frequency begins dropping is below the CCM/DCM boundary.

It will be appreciated by those skilled in the art having the benefit of this disclosure that this voltage regulator modulator has linear period stretching capability. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A voltage regulator, comprising:
    switching circuitry for generating a PWM waveform responsive to an error compensated voltage;
    an output filter for smoothing the PWM waveform;
    an error amplifier for generating a voltage error signal responsive to an output voltage and a reference voltage;
    a modulator circuit for generating a periodic triangular waveform, wherein the modulator continuously increases a period of the periodic triangular waveform responsive to a decreased load in a discontinuous current mode of operation of the voltage regulator; and
    a comparator for generating the error compensated voltage responsive to the periodic triangular waveform and the voltage error signal.

2. The voltage regulator of claim 1, wherein the modulator further maintains a fixed frequency of the periodic triangular waveform in a continuous current mode of operation.

3. The voltage regulator of claim 1, wherein the modulator further includes:
    a capacitor;
    first circuitry for generating a charging current for the capacitor, wherein the first circuitry charges the capacitor to a first voltage level and discharges the capacitor to a second voltage level; and
    second circuitry for decreasing the charging current in the discontinuous current mode of operation of the voltage regulator, wherein the decrease in charging current continuously increases the period of the periodic triangular waveform.

4. The voltage regulator of claim 3, wherein the second circuitry further comprises:
    control logic for generating an indication when the voltage regulator is operating in the discontinuous current mode of operation; and
    third circuitry for switching an additional transistor into a current mirror to increase a width of the current mirror, wherein the increase in the width of the current mirror decreases the charging current.

5. The voltage regulator of claim 4, wherein a size of the additional transistor establishes a minimum frequency of the periodic triangular waveform.

6. The voltage regulator of claim 4, wherein the indication that the voltage regulator is in the discontinuous current mode of operation further comprises an indication that each transistor of the switching circuitry is turned off.

7. The voltage regulator of claim 4, further including delay logic for delaying the indication from the control logic.

8. A modulator for use with a voltage regulator, comprising:
    an input for receiving an input voltage;
    an output for providing a periodic triangular waveform;
    at least one input for receiving an indication that the voltage regulator is in discontinuous current mode of operation;
    circuitry for generating the periodic triangular waveform responsive to the input voltage and the indication that the voltage regulator is in the discontinuous current mode of operation, wherein the circuitry continuously increases a period of the periodic triangular waveform responsive to a decreased load in a discontinuous current mode of operation of the voltage regulator.

9. The modulator of claim 8, wherein the circuitry further maintains a fixed frequency of the periodic triangular waveform in a continuous current mode of operation of the voltage regulator.

10. The modulator of claim 8, wherein the circuitry further includes:
    a capacitor;
    first circuitry for generating a charging current for the capacitor, wherein the first circuitry charges the capacitor to a first voltage level and discharges the capacitor to a second voltage level; and
    second circuitry for decreasing the charging current in the discontinuous current mode of operation of the voltage regulator, wherein the decrease in charging current continuously increases the period of the periodic triangular waveform.

11. The modulator of claim 10, wherein the second circuitry further comprises:
    control logic for generating an indication when the voltage regulator is operating in the discontinuous current mode of operation; and
    third circuitry for switching an additional transistor into a current mirror to increase a width of the current mirror, wherein the increase in the width of the current mirror decreases the charging current.

12. The modulator of claim 11, wherein a size of the additional transistor establishes a minimum frequency of the periodic triangular waveform.

13. The modulator of claim 11, wherein the indication that the voltage regulator is in the discontinuous current mode of operation further comprises an indication that each transistor of the switching circuitry is turned off.

14. The voltage regulator of claim 11, further including delay logic for delaying the indication from the control logic.

15. A method for controlling a voltage regulator, comprising the steps of:
    generating a PWM waveform responsive to a periodic triangular waveform and a voltage error signal;

generating the voltage error signal responsive to an output voltage and a reference voltage;

generating a periodic triangular waveform;

continuously increasing a period of the periodic triangular waveform responsive to a decreased load in a discontinuous current mode of operation of the voltage regulator.

16. The method of claim 15, further including the step of maintaining a fixed frequency of the periodic triangular waveform in a continuous current mode of operation of the voltage regulator.

17. The method of claim 15, wherein the step of continuously increasing further includes the steps of:

generating a charging current;

decreasing the charging current in the discontinuous current mode of operation of the voltage regulator, wherein the decrease in charging current continuously increases the period of the periodic triangular waveform;

charging the capacitor to a first voltage level according the decreased charging current; and discharging the capacitor to a second voltage level according the decreased charging current.

18. The method of claim 17, wherein the step of decreasing the charging current further comprises the steps of:

generating an indication when the voltage regulator is operating in the discontinuous current mode of operation; and switching an additional transistor into a current mirror to increase a width of the current mirror, wherein the increase in the width of the current mirror decreases the charging current.

19. The method of claim 18, further including the step of establishing a minimum frequency of the periodic triangular waveform by sizing the additional transistor.

20. The method of claim 18, wherein the step of generating the indication that the voltage regulator is in the discontinuous current mode of operation further comprises the step of generating an indication that each switching transistor of the voltage regulator is turned off.

21. The method of claim 18 further including the step of time delaying the indication for a selected period of time.

\* \* \* \* \*

UNITED STATES PATENT AND TRADEMARK OFFICE
CERTIFICATE OF CORRECTION

PATENT NO. : 7,990,116 B2  
APPLICATION NO. : 12/173602  
DATED : August 2, 2011  
INVENTOR(S) : Bao Q. Vu Page 1 of 1

It is certified that error appears in the above-identified patent and that said Letters Patent is hereby corrected as shown below:

In Col. 7, Claim 1, line 44, the word --circuit-- should be inserted between the words modulator and continuously.

In Col. 7, Claim 2, line 51, the word --circuit-- should be inserted between the words modulator and further.

In Col. 7, Claim 3, line 54, the word --circuit-- should be inserted between the words modulator and further.

In Col. 8, Claim 14, line 62, delete "voltage regulator" and insert therefor --modulator--.

Signed and Sealed this  
Twenty-eighth Day of August, 2012

David J. Kappos  
*Director of the United States Patent and Trademark Office*

UNITED STATES PATENT AND TRADEMARK OFFICE
CERTIFICATE OF CORRECTION

PATENT NO.         : 7,990,116 B2
APPLICATION NO.    : 12/173602
DATED              : August 2, 2011
INVENTOR(S)        : Eric Magne Solie et al.

It is certified that error appears in the above-identified patent and that said Letters Patent is hereby corrected as shown below:

In Col. 7, Claim 1, line 44, the word --circuit-- should be inserted between the words modulator and continuously.

In Col. 7, Claim 2, line 51, the word --circuit-- should be inserted between the words modulator and further.

In Col. 7, Claim 3, line 54, the word --circuit-- should be inserted between the words modulator and further.

In Col. 8, Claim 14, line 62, delete "voltage regulator" and insert therefor --modulator--.

This certificate supersedes the Certificate of Correction issued August 28, 2012.

Signed and Sealed this
Ninth Day of October, 2012

David J. Kappos
*Director of the United States Patent and Trademark Office*